Oct. 11, 1966  G. F. SMYTH  3,277,504
METHOD OF FABRICATING A SELF-LOCKING SCREW-THREADED FASTENER
Original Filed Dec. 18, 1963  2 Sheets-Sheet 1
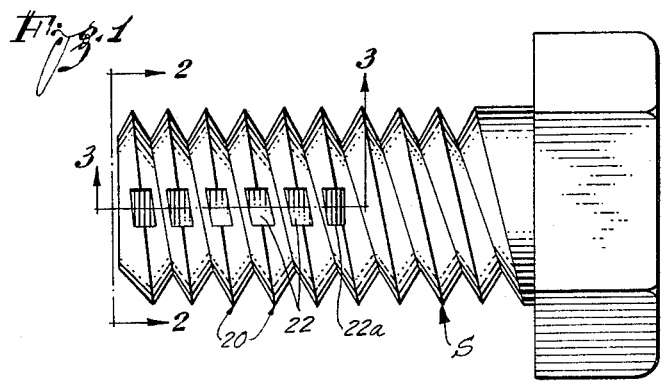
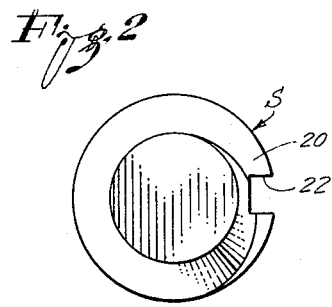
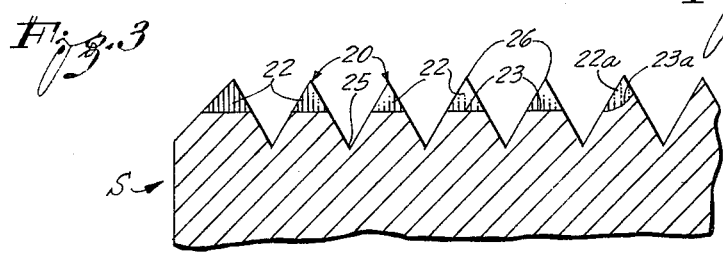
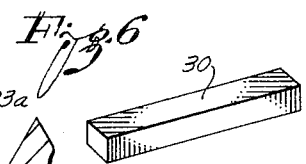
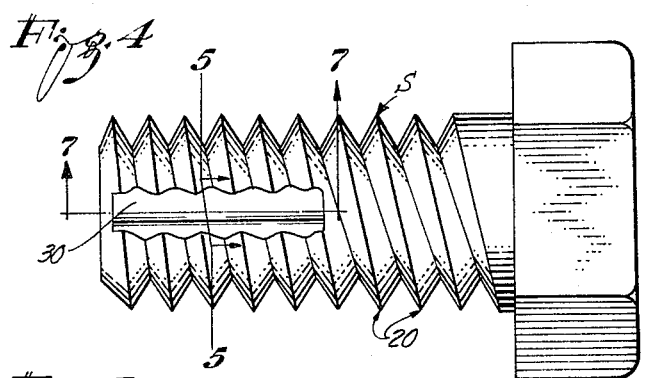
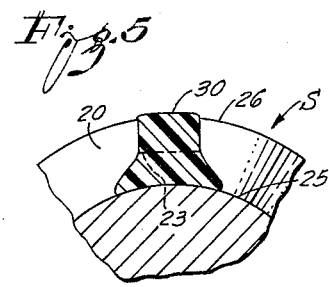
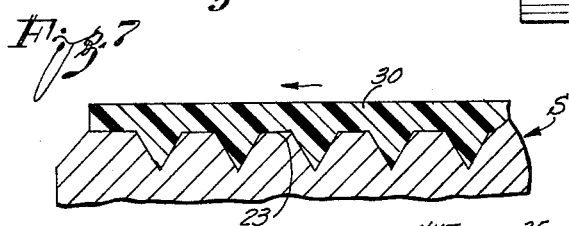
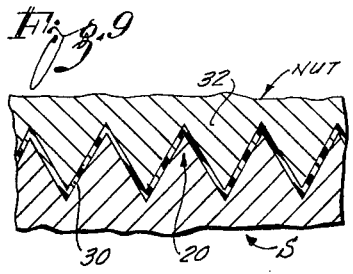
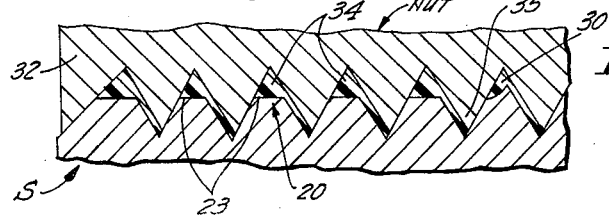
INVENTOR
George F. Smyth
By Smyth, Roston & Pavitt
Attorneys

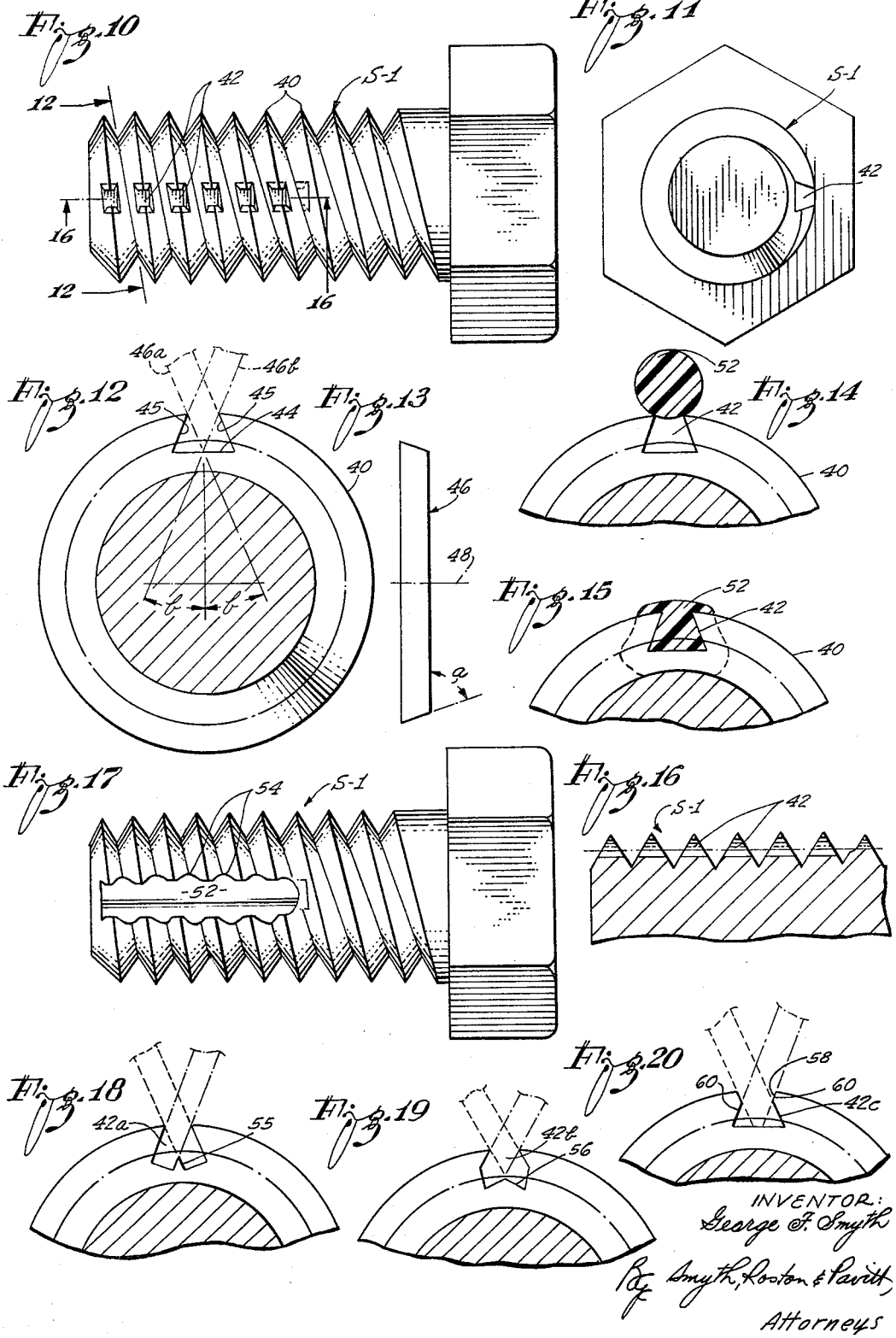

United States Patent Office 3,277,504
Patented Oct. 11, 1966

3,277,504
METHOD OF FABRICATING A SELF-LOCKING SCREW-THREADED FASTENER
George F. Smyth, Los Angeles, Calif., assignor to Long-Lok Corporation, Los Angeles, Calif., a corporation of California
Original application Dec. 18, 1963, Ser. No. 331,992, now Patent No. 3,182,703, dated May 11, 1965. Divided and this application Sept. 23, 1964, Ser. No. 398,805
3 Claims. (Cl. 10—10)

This invention relates to a method of fabricating a self-locking screw threaded fastening member of the type in which the self-locking action is achieved by means of resiliently deformable plastic material. The fastening member may be of the general character of a screw for engagement by a complementary nut, or, conversely, may be of the general character of a nut for engagement with a complementary screw. This application is a division of my copending application Serial No. 331,992 filed December 18, 1963, now Patent No. 3,182,703, which in turn is a continuation-in-part of my copending application of the same title, Serial No. 811,869, filed May 8, 1959 and now abandoned.

As described in my copending application, a self-locking, screw-threaded fastening member of this general type for use with a cooperating element having a complementary thread must achieve sufficiently effective frictional engagement with the complementary element to prevent loosening under the most adverse conditions, for example conditions involving repeated varying stress and conditions involving high energy vibration. A common expedient for obtaining such frictional engagement is to insert a body of deformable material between the screw thread of the fastening member and the complementary thread of the cooperating element. Thus a deformable insert may be added to a fastening member such as a screw, for promoting frictional engagement with a cooperating nut or may be added to a nut for promoting frictional engagement with a cooperating screw.

In some prior art practices, the required increased frictional engagement is achieved primarily by the frictional grip of the plastic material on the complementary thread of the cooperating element. In other practices, the increased frictional engagement is provided almost entirely by the insert body crowding the fastening member diametrically against the cooperating element. In other instances, the insert produces the desired effective frictional engagement by causing the fastening member and the cooperating element to exert axial thrust against each other with consequent axial pressure by the turns of the screw thread of the fastening member against the turns of the thread of the cooperating element.

In a fastening member constructed in accordance with the teachings of the present invention, the insert body presses the fastening member diametrically against the cooperating threaded element for increased frictional engagement between the fastening member and the cooperating element and, in addition, the insert material makes highly effective frictional contact with extensive areas of the thread of the cooperating element. An important feature of the fastening member fabricated by the method of the present invention, however, is the trapping of a series of spaced portions of the resiliently deformable plastic material between the screw thread of the fastening member and the thread of the cooperating element in such manner that each trapped portion in effect develops high fluid pressure. The total effect is a high magnitude diametrical thrust force exerted between the fastening member and the cooperating element.

The fastening member which achieves this close approach to a hydraulic effect is one fabricated in accordance with the teachings of this invention which comprises forming a series of longitudinally aligned notches in successive turns of the screw thread of the fastening member to truncate corresponding portions of the screw thread and by seating an elongated body of resiliently deformable plastic material in the series of notches. The insert body straddles the notches or truncated portions of the screw thread, fills the valleys of the screw thread in the longitudinal region of the notches and bulges into the valleys in both lateral directions from the longitudinal region of the notches.

As the thread of the cooperating element advances relative to the screw thread of the fastening member, it progressively crowds the plastic material in the region of each notch and at the same time progressively restricts the avenues of escape. The avenues of escape are the thin clearance spaces between the screw thread of the fastening member and the thread of the cooperating element and the resistance to deformation flow of the plastic material through these thin clearance spaces is exceedingly high. As the result of this action whereby the plastic trapped in each notch is progressively compressed in opposition to high resistance along the escape paths, exceedingly high plastic pressure is developed at spaced points along a longitudinal region between the fastening member and the cooperating element.

An important feature of the fastening member fabricated by the method of this invention is the manner in which the insert body is interlocked with the fastening member. With the insert body extending through the longitudinally aligned notches of the screw thread, the insert body is anchored against lateral displacement when acted upon by the thread of the cooperating element. The straddling of the notches or truncated portions of the screw thread by the insert body and the lateral bulging of the insert body into the adjacent valleys of the screw thread of the fastening member effectively resist longitudinal displacement of the insert body when the insert body is acted upon by the advancing thread of the cooperating element. The interlocking relationships between the insert body and the fastening member also result in the insert body being effectively secured against separation from the fastening member prior to actual use.

Another important feature of the fastening member fabricated by the method of this invention is that the provision of the aligned notches does not lessen the strength of the screw. It is well known that the resistance of a screw to stresses in tension and in shear is determined by the material inside the minor diameter of the screw, i.e. the diameter at the roots of the thread. If a longitudinal groove to receive a plastic insert is cut into the threaded portion of a screw in the conventional manner, the groove removes material of the screw from inside the minor diameter of the screw and thus weakens the screw. The aligned notches of the present invention are spaced radially outward from the minor diameter of the screw.

An important advantage of the fastening member fabricated by the method of this invention in contrast to fastening devices that are formed with deep grooves to seat inserts is that the exceedingly small amount of metal that is removed from seating the insert makes it possible to fabricate the fastening member at relatively low cost. In the first place the metal removing step may be carried out at high speed for a high production rate and in the second place the service life of a cutting tool that is employed to remove the metal is multiplied many times for substantial reduction in tool cost.

Certain embodiments in the fastening member fabricated by the method of this invention described herein are further characterized by the aligned notches in the successive turns of the screw thread being formed with overhanging walls. For example, the notches may be of dovetail configuration in transverse cross section. The important advantages of providing the overhanging walls is that the plastic insert is interlocked with the fastening member for positive prevention of relative movement of the insert in three dimensions.

A feature of some embodiments of the fastening member fabricated by the method of this invention is the further concept of forming the bottoms of the aligned dovetailed notches with ribs of tapered cross section, for example, ribs of triangular cross-sectional configuration. When the insert is forced into the aligned notches, the tapered ribs in the bottoms of the notches spread the insert in opposite lateral directions for more effective engagement with the overhanging side walls of the notches.

The features and advantages of the invention may be understood from the following detailed description considered with the accompanying drawings.

In the drawings, which are to be regarded as merely illustrative:

FIG. 1 is a plan view of a self-locking fastening member in the form of a screw fabricated according to a selected practice of the invention, the insert being omitted and the view showing in plan the aligned notches through successive turns of the screw thread;

FIG. 2 is an end elevation of the self-locking screw viewed along the line 2—2 of FIG. 1;

FIG. 3 is an enlarged fragmentary longitudinal section taken along the line 3—3 of FIG. 1, the section being taken through the aligned notches;

FIG. 4 is a view similar to FIG. 1 with the plastic insert installed;

FIG. 5 is an enlarged fragmentary section taken as indicated by the line 5—5 of FIG. 2 and showing the cross-sectional configuration of the installed insert;

FIG. 6 is a perspective view of the insert prior to its installation;

FIG. 7 is a fragmentary longitudinal section of the installed insert taken as indicated by the line 7—7 of FIG. 5;

FIG. 8 is a section taken on the same line after a cooperating element in the form of a nut is threaded onto the self-locking screw, the view showing how spaced portions of the insert material are trapped in the aligned notches;

FIG. 9 is a view similar to FIG. 8 with the longitudinal section shifted to one side of the aligned notches but adjacent thereto to show how the paths of escape for the plastic material trapped in the notches are exceedingly restricted to favor the creation of pressure of high magnitude in the trapped portions;

FIG. 10 is a plan view similar to FIG. 1 showing a second embodiment of the fastening member fabricated according to the teachings of the invention in which the aligned notches are of dovetail configuration with overhanging side walls;

FIG. 11 is an end elevation of the screw shown in FIG. 10;

FIG. 12 is an enlarged transverse section along the line 12—12 of FIG. 10 showing in phantom how the dovetail notches may be cut by two passes of suitably shaped cutting tools;

FIG. 13 shows the profile and axis of rotation of the cutting tool;

FIG. 14 is a fragmentary sectional view similar to FIG. 12 showing a plastic insert positioned in preparation for the step of forcing the insert laterally into engagement with the dovetail notches;

FIG. 15 is a similar view after the completion of the step of forcing the insert into the aligned notches;

FIG. 16 is a fragmentary longitudinal section view along the line 16—16 of FIG. 10;

FIG. 17 is a view similar to FIG. 10 with the plastic insert installed;

FIG. 18 is a fragmentary cross sectional view similar to FIG. 12 showing how two passes of a cutting tool may be employed to form aligned notches that not only have overhanging side walls but also have tapered ribs on their bottom walls;

FIG. 19 is a view similar to FIG. 18 showing how a tool of a different configuration may be employed in the same manner to form aligned notches of somewhat different cross sectional configuration; and FIG. 20 is a view similar to FIG. 12 showing how the same tool may be used to form dovetail notches with flared entrances.

FIGS. 1 to 9 of the drawings show how the invention may be applied to the fabrication of a well known type of screw, generally designated by the letter S, the shank of the screw being formed with a conventional screw thread 20. In accord with the screw member fabricated by the method of this invention, a series of aligned notches 22 having bottoms 23 are cut or otherwise formed in successive turns of the screw thread 20. The notches 22 are aligned generally longitudinally of the screw S and in this particular example are aligned exactly parallel with the axis of the screw.

The series of notches is of substantial length for effective self-locking operation but, as may be seen in FIG. 1, the series need not extend the full length of the shank of the screw. Preferably the series of notches begins at the leading end of the screw with the first notch in the first turn of the screw thread. For economy in manufacture, the series of notches 22 may be formed in one operation by the application of a side milling cutter. Consequently, at least one notch at the end of the series has an arcuate bottom. Thus FIG. 3 shows a notch 22a with a curved bottom 23a.

The bottoms of the notches 22 are intermediate the major and minor diameters of the screw thread 20. In this particular example, the bottoms of the notches are approximately half-way between the minor diameter at the bottom of the valleys 25 of the screw thread 20 and the major diameter at the crests 26 of the screw thread. Thus the notches 22 being relatively shallow and at the same time being relatively narrow do not weaken the screw S to any significant degree. The fact that the notches are relatively narrow is readily apparent in FIG. 1.

FIG. 6 shows an insert body 30 of suitable plastic material dimensioned for installation on the screw S. Any suitable resiliently deformable plastic material may be employed that is incompressible but is capable of elastic flow under pressure. Nylon is satisfactory for this purpose. Other plastics such as polytetrafluoroethylene and polytrifluorochloroethylene may be used.

The width of the insert body 30 prior to installation is at least approximately the width of the notches 22 and is preferably dimensioned for forced fit into the notches. The depth dimension of the insert body 30 prior to installation may vary somewhat for a given screw depending upon the depth to which the notches 22 are cut in the screw. The depth should be sufficient for the installed insert to completely fill the screw thread valleys 25 in the longitudinal region of the notches 22 and in addition to bulge or flare in both lateral directions into the portions of the valleys immediately adjacent the longitudinal region of the notches. The bulging may be seen in FIG. 5. It is further contemplated that the installed insert body will extend at least to the crests 26 of the turns of the screw thread and preferably slightly beyond the crests, as may be seen in FIG. 5.

To meet these requirements, the depth of the insert body may be the radial dimension of the screw thread 20. Since substantial portions of the insert body are displaced by the truncated portions of the screw thread formed by the notches 22, however, the depth of the insert body may be less than the radial dimension of the screw thread 20.

The insert body of uniform rectangular cross section shown in FIG. 6 is forced laterally into the series of notches 22 with sufficient pressure to cause permanent deformation of the insert to the installed configuration shown in FIGS. 4 and 5. Obviously, the deformation force must exceed the elastic limits of the insert material. The installed insert fits sufficiently tightly in the notches 22 for the insert to stay in its installed position during the period in which the self-locking screw is transported and handled prior to actual use.

When an internally threaded cooperating element, such as a nut is applied to the screw S for a fastening purpose, the leading end of the internal screw thread advances helically along the helical valley of the screw thread 20. During this advance of the internal thread of the complementary element, the insert body 30 is effectively anchored against bodily longitudinal movement out of the series of notches 22. A portion of the resistance to longitudinal displacement of the insert body is provided by the frictional grip of the notches 22 but the major portion of the resistance is provided by the serrated configuration of the bottom of the insert in interlocking engagement with the truncated portions of the successive turns of the screw thread. Further resistance to longitudinal displacement of the insert body is provided by the bulging of the insert material laterally into the valleys of the screw thread 20 on opposite sides of the longitudinal region of the notches 22.

The fastening member fabricated by the method of the invention takes advantage of the fact that the leading edge of the internal screw thread of the cooperating fastening element is always tapered, being of reduced radial dimension and progressively increasing to the full radial dimension. As a result of this taper, the advancing screw thread acts progressively to crowd the plastic material of the insert into each of the successive notches 22. Thus the plastic material in the region of each of the notches 22 is progressively compressed and at the same time the advancing internal screw thread progressively restricts the avenues of escape from the notches by progressively occupying greater portions of the valleys of the screw thread 20 adjacent each of the notches 22. With the avenues of escape displacement progressively restricted, fluid pressure of high magnitude is created in each portion of the insert material that is trapped in a notch 22.

These various effects may be understood by reference to FIGS. 7, 8 and 9. FIG. 7 shows the longitudinal sectional configuration of the insert body 30 after the insert body is installed in the screw S but before a cooperating internally threaded fastening element is applied to the screw for a fastening purpose.

FIG. 8 shows the longitudinal zig-zag configuration of the insert body 30 after an internally threaded cooperating fastening element such as a nut 32 is applied to the screw and shows how spaced portions 34 of the insert material of triangular cross-sectional configuration are trapped in the successive notches 22. It is readily apparent that since the advancing internal screw thread 35 of the nut 32 straddles the notches 22 and enters the valleys on opposite sides of each notch, the displacement of the material from the valleys on opposite sides of each notch tends to crowd material into each of the notches. The crowding action places the triangular portion 34 of plastic material in each notch under high pressure and especially so because the crowding action occurs from both sides of each notch simultaneously. The crowded material must be displaced somewhere and the only avenues of displacement escape are along the helical paths provided by the clearance space between the screw thread 20 of the screw S and the internal screw thread 35 of the nut 32. FIG. 9 clearly shows how restricted these helical escape avenues are. It may be readily appreciated that the resistance to displacement flow into the helical clearance spaces shown in FIG. 10 is of exceedingly high magnitude.

FIGS. 10 to 16 illustrate a second practice of the invention which is characterized by the concept of forming the series of notches with overhanging side walls for positive prevention of removal of the insert from the notches in a direction radially outwardly of the screw.

In the second practice of the invention, a screw, generally designated S–1, is formed with a conventional screw thread 40 and aligned notches 42 are formed in successive turns of the screw thread. The notches 42 may be aligned generally longitudinally of the screw and in this instance the notches have bottom walls 44 that are parallel with the axis of the screw. Each of the two side walls 45 of each of the notches 42 overhangs the bottom wall 44 so that each notch is of maximum width at its bottom as measured in a circumferential direction.

In the preferred practice of the invention, the aligned notches 42 are cut by two passes of a rotary cutting tool 46 that is shown in profile in FIG. 13. The rotary cutting tool 46 is a side milling cutter that rotates on the axis indicated by the broken line 48. It is to be noted that the cutting edge of the tool is beveled, the bevel angle or angle relative to the plane of rotation of the tool being designated $a$ in FIG. 13.

As may be seen in FIG. 12 the aligned notches 42 are symmetrical with respect to a diameter 50 of the screw. At one pass of the rotary cutter 46 longitudinally of the screw, the cutter is at the position indicated at 46a in FIG. 12, the tool being inclined in one direction at the angle $b$ relative to the diameter 50. For the second pass, the tool is at the position indicated 46b in FIG. 12, the tool being inclined in the opposite direction relative to the diameter 50 at the same angle $b$. In this instance the sum of the two angles $a$ and $b$ is substantially equal to 90° and the two positions 46a and 46b intersect at substantially the major diameter or crest diameter of the screw thread. The width and depth of the two cuts are such that the width of the bottom of the notch is substantially twice the width of the tool 46. Since the sum of the two angles $a$ and $b$ is substantially equal to 90° the bottom wall 44 of each notch is a flat wall that is perpendicular to the diameter 50.

An insert to be installed in the series of notches 42 may be of any suitable cross sectional configuration including the rectangular cross sectional configuration of the previously described insert 30 shown in FIG. 6. FIG. 14, however, shows, how a plastic insert body 52 of the previously described character and of cylindrical configuration may be positioned longitudinally of the screw in preparation for the application of force to drive the insert into the series of notches in the manner heretofore described.

FIGS. 15 and 17 show the installed insert 52 and it will be noted in FIG. 15 that the insert spreads out laterally to completely fill each of the notches. FIG. 17 shows how the completely installed insert is formed with lateral bulges 54 that extend into the valleys of the screw threads adjacent the notches. It is apparent that the installed insert 52 is positively engaged by the screw in a manner to prevent shifting of the insert in any direction relative to the screw. Thus the side walls of the notches 42 prevent displacement of the insert body circumferentially of the screw; the overhanging of the side walls of the notches with the insert completely filling each notch serves to prevent outward relative movement of the installed insert radially of the screw; and the interlocking of the installed insert with the truncated portions of the successive turns of the screw thread prevents longitudinal shift of the insert relative to the screw.

FIG. 18 shows diagrammatically how a series of notches 42a may be cut to the same general dovetailed cross sectional configuration with the further provision of a longitudinal tapered or wedge-shaped rib 55 projecting outwardly from the bottom of each notch. The cutting edge of the cutting tool that is employed to form the series of notches 42a is not tapered but may be tapered if desired. The width of the cutting tool and the depth of the two cuts are such that the ribs 55 are formed. It is apparent in FIG. 18 that the taper of a notch 42a and the taper of the rib 55 in the notch are equal with the sides of the rib parallel with the side walls of the notch.

The advantage of providing the ribs 55 in the aligned notches 42a is that the ribs displace the material of the insert body laterally against the side walls of the notches. Thus each of the ribs 55 serves as a wedge element that penetrates the installed insert and spreads the insert laterally in both directions into pressure contact with the side walls of the notches.

FIG. 19 shows how the cutting tool may be tapered in both directions to form an aligned series of notches 42b with a relatively broad and less sharp rib 56 in the bottom in each notch. The ribs 56 have the same spreading function as the ribs 55.

FIG. 20 shows how a cutting tool, for example the previously described cutting tool 46, may be employed in the general manner heretofore described to form a series of notches 42c each of which has a flared entrance 58 at its outer end. The unique feature of this particular practice of the invention is that the two oppositely inclined positions of the cutting tool shown in dotted lines in FIG. 20 intersect in a radial zone that is inward from the major diameter or crest of the screw thread.

The result is that the side walls of the notches 42c overhang the bottom walls of the notches with the advantages heretofore mentioned but, in addition, each notch is formed with a flared entrance that facilitates introduction of a plastic insert body. Thus the narrowest part of each notch is radially inward from the outer circumference of the screw, each notch having a pair of opposite edges 60 that form a neck in the notch with the two edges penetrating the material of the installed insert body.

It is to be noted that in all forms of the fastening member fabricated according to the teachings of the invention the bottoms of the notches are intermediate the minor and major diameters of the screw thread. In other words, the bottom wall of each notch is radially outward from the root diameter of the screw thread but is radially inward from the crest diameter of the screw thread.

My description of the various practices of the invention in specific detail will suggest various changes, substitutions and other departures from my disclosure within the spirit and scope of the appended claims.

I claim:

1. A method of processing a screw threaded fastening member to produce a self-locking fastening member, characterized by the steps of:

deforming the crests of successive turns of the screw thread of the fastener along a longitudinal zone to a depth less than the valleys between the successive turns to define a truncation in each deformed turn of the screw thread with pairs of spaced confronting side walls extending outward from the respective truncations and defining the opposite longitudinal boundaries of said longitudinal zone; and forcing into said zone between the confronting side walls an elongated insert of deformable plastic material of a cross-sectional area greater than the cross-sectional area defined by the confronting walls to cause the material of the insert to be displaced in opposite lateral directions into the valleys between the successive turns of the screw thread to interlock the insert with the screw thread.

2. A method as set forth in claim 1 in which the step of deforming the crests of the turns of the screw thread is carried out by two passes of a rotary cutting tool in the region of a given diameter of the fastening member with the plane of rotation of the tool inclined in opposite directions from the given diameter during the two passes respectively and with the planes of rotation of the two passes intersecting to give the confronting side walls the configuration of overhanging walls to resist withdrawing of the insert from the fastening member.

3. A method of processing a screw threaded fastening member to produce a self-locking fastening member, characterized by the steps of:

forming longitudinally aligned recesses in selected successive turns of the screw thread of less depth than the valleys between said successive turns to provide a longitudinal zone formed of said aligned recesses with a valley intermediate each adjacent pair of recesses; and forcing into said zone an elongated insert of deformable plastic material of a cross-sectional area greater than the cross-sectional area of the zone to cause the material of the insert to fill said recesses and the valleys intermediate each adjacent pair of recesses and to extend laterally of the zone into interlocking engagement with the turns of the screw thread at the opposite edges of said longitudinal zone.

References Cited by the Examiner

UNITED STATES PATENTS

| 68,592 | 9/1867 | Ayres | 10—5 |
|---|---|---|---|
| 1,754,736 | 4/1930 | Bryant | 10—141 |
| 2,956,293 | 10/1960 | McKay et al. | 10—10 |

ANDREW R. JUHASZ, *Primary Examiner.*